US007714852B1

(12) United States Patent
Jarman et al.

(10) Patent No.: US 7,714,852 B1
(45) Date of Patent: May 11, 2010

(54) SYSTEMS AND METHODS FOR BLANKING A DISPLAY SCREEN ON A DISPLAY DEVICE OF A COMPUTER SYSTEM

(75) Inventors: James Jarman, Lehi, UT (US); David Jensen, Cedar Hills, UT (US)

(73) Assignee: LANDesk Software Limited, Shannon (IE)

( * ) Notice: Subject to any disclaimer, the term of this patent is extended or adjusted under 35 U.S.C. 154(b) by 1217 days.

(21) Appl. No.: 11/271,638

(22) Filed: Nov. 10, 2005

(51) Int. Cl.

| | |
|---|---|
| ***G06F 3/038*** | (2006.01) |
| ***H04N 3/24*** | (2006.01) |
| ***H04N 5/68*** | (2006.01) |
| ***G09G 5/00*** | (2006.01) |
| ***G06F 1/00*** | (2006.01) |

(52) U.S. Cl. ....................... 345/204; 348/633; 348/632; 348/730; 345/211; 345/618; 713/300; 713/310

(58) Field of Classification Search .................. 345/30, 345/87, 204, 211, 618; 713/300, 310
See application file for complete search history.

(56) References Cited

U.S. PATENT DOCUMENTS

| | | | | |
|---|---|---|---|---|
| 5,880,719 | A * | 3/1999 | Kikinis | 345/212 |
| 6,206,063 | B1 * | 3/2001 | Lin | 144/285 |
| 6,209,063 | B1 * | 3/2001 | Kempf | 711/135 |
| 6,441,868 | B1 * | 8/2002 | Park | 348/633 |
| 7,057,591 | B1 * | 6/2006 | Hautanen et al. | 345/87 |
| 2004/0117679 | A1 * | 6/2004 | Kim | 713/320 |
| 2005/0010828 | A1 * | 1/2005 | Oh | 713/300 |
| 2005/0066158 | A1 * | 3/2005 | Mowery et al. | 713/2 |
| 2007/0055740 | A1 * | 3/2007 | Luciani et al. | 709/217 |

* cited by examiner

*Primary Examiner*—Bipin Shalwala
*Assistant Examiner*—Benyam Ketema
(74) *Attorney, Agent, or Firm*—Austin Rapp & Hardman

(57) ABSTRACT

In an exemplary method, a filter driver on a computer system receives notification of an event during which a display screen on a display device of the computer system should be blank. An example of such an event is a remote management operation being performed on the computer system. The filter driver receives messages that are directed to a display driver for the display device. The filter driver receives the messages before they are received by the display driver. Some of the messages may comprise a power on message that, if received by the display driver, would cause the display screen to be powered on. The filter driver discards each power on message that is received during the event so that the display driver does not receive any power on messages during the event.

20 Claims, 8 Drawing Sheets

SYSTEMS AND METHODS FOR BLANKING A DISPLAY SCREEN ON A DISPLAY DEVICE OF A COMPUTER SYSTEM

TECHNICAL FIELD

The present invention relates generally to computers and computer-related technology. More specifically, the present invention relates to systems and methods for blanking a display screen on a display device of a computer system.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers, particularly those used in business operations, may require remote management operations to add, repair, or change the configuration of the software and/or hardware. Often these management operations, though initiated and controlled remotely, cause changes that are visible on the display screen of the local computer. These visible changes may be undesirable for a variety of reasons.

For example, the visible changes on the display screen may present a security risk. During a remote management operation a technician may need to access resources, enter credentials, run applications, or perform other operations whose visual display would reveal information that may allow a user to more successfully violate security, corporate, or common-sense policies of behavior.

Visible changes on the display screen may also be a possible cause for alarm to any person who can see them. Persons at or near the managed node may or may not be aware of the intent and methods of the remote management operation. A well-intentioned person could perceive that the changes on the screen indicate that a computer virus, spy ware program, or other malicious program is running. As a result, someone may attempt to stop the perceived malicious program by terminating running processes, disconnecting resources, or powering off the system. These actions may interfere with the management operation and may also lead to the managed node being in an unstable or unusable state.

In view of the foregoing, benefits may be realized by systems and methods for blanking a computer's display screen at various times, such as during remote management operations. Unfortunately, known systems and methods for blanking a computer's display screen suffer from various drawbacks. Embodiments disclosed herein relate to improved systems and methods for blanking a computer's display screen.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
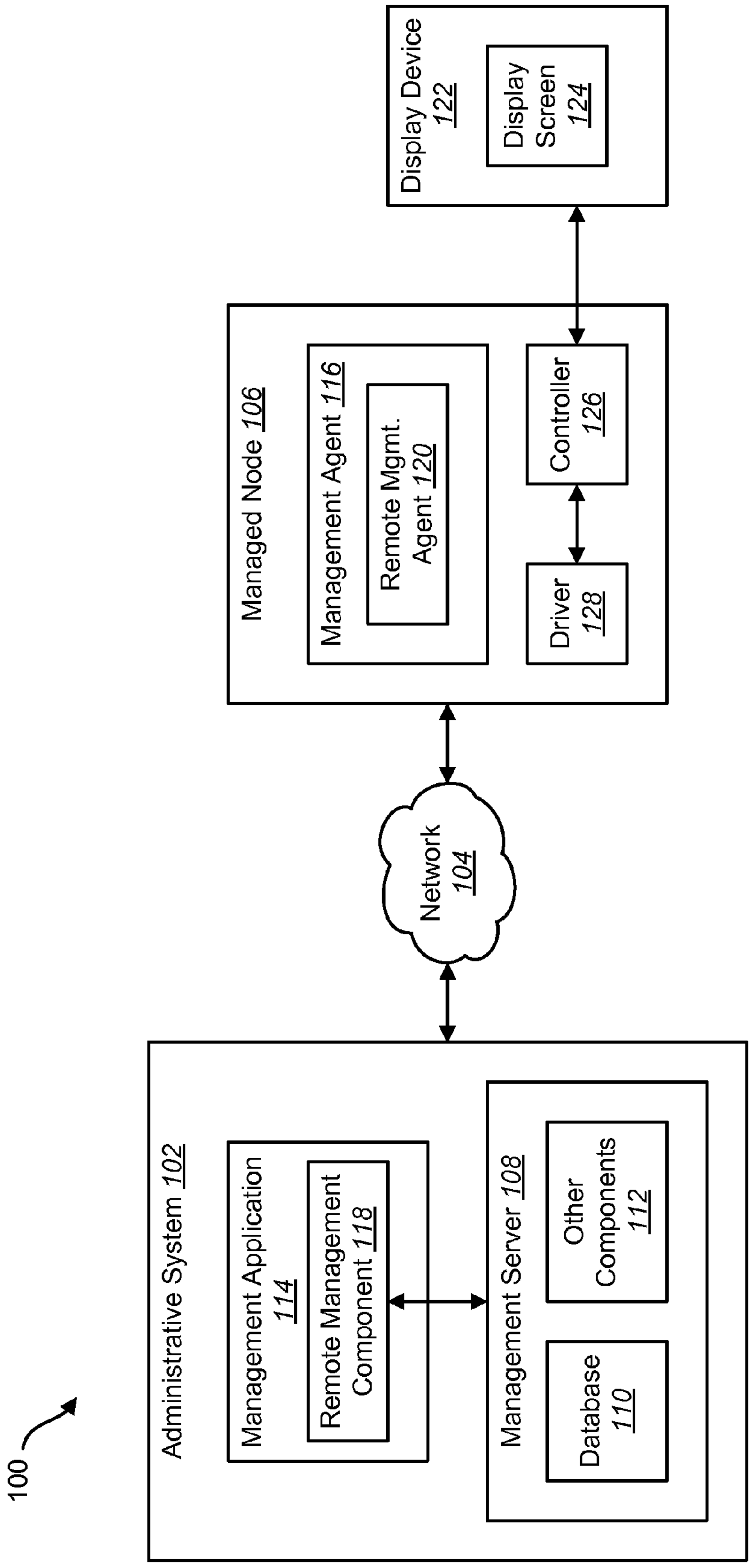
FIG. 1 illustrates an exemplary system in which an embodiment may be practiced, the system including a managed node having a management agent and a display driver for a display device.

Embodiments disclosed herein relate to systems and methods for blanking a display screen on a display device of a computer system. In an exemplary embodiment, a filter driver on the computer system is configured to receive messages that are directed to a display driver for the display device before the messages are received by the display driver. Such messages may include "power on" messages, which are messages that, if received by the display driver, would cause the display screen to be powered on. The filter driver receives notification of events during which the display screen should be blank. An example of this kind of event is a remote management operation that is being performed on the computer system. The filter driver discards each power on message that is received during such events, so that the display driver does not receive any power on messages during such events. In this way, the display screen may remain blank during such events.

The computer system may be a managed node in a computer network. A management application on an administrative system may notify a management agent on the computer system whenever a remote management operation is going to be performed on the computer system. In response to being notified that a remote management operation is going to be performed on the computer system, the management agent may notify the filter driver about the remote management operation. The management agent may notify the filter driver about a particular remote management operation by sending a first message at a starting point for the remote management operation, and then sending a second message at an ending point for the remote management operation.

Prior to the start of a remote management operation being performed, the management agent may cause the display screen of the display device to be powered off. This may involve making a call to a method that is exposed by the operating system and that provides for such a power transition. In response to such a method being called, the operating system sends a message to the display driver which instructs the display driver to power off the display screen. The power off message is received by the filter driver before it is received by the display driver. The filter driver passes the power off message to the display driver.

After a remote management operation has been completed, the filter driver may cause the display screen of the display device to be powered on again. This may be accomplished by sending a power on message to the display driver, i.e., a message which simulates an instruction from the operating system to power on the display screen. In response to receiving a power on message from the filter driver, the display driver causes the display screen to be powered on.

As indicated above, the filter driver receives messages that are directed to a display driver for the display device before the messages are received by the display driver. This may be accomplished by attaching to a device stack for the display device so that it is positioned above the display driver in the device stack.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates an exemplary system 100 in which an embodiment may be practiced. An administrative computer system 102 is connected to a computer network 104, such as a corporate local area network (LAN). The administrative system 102 is used to manage other computer systems that are also connected to the computer network 104. These other computer systems will be referred to herein as "managed nodes." For simplicity, only a single managed node 106 is shown in the system 100 of FIG. 1.

The administrative system 102 includes a management server 108. The management server 108 includes a database 110 of information. The management server 108 also includes various other components 112 that are configured to perform tasks such as scheduling, handling alerts, and so forth. An example of a management server 108 that may be used with embodiments disclosed herein is the core server for the LANDesk® Management Suite.

The administrative system 102 also includes a management application 114. The management application 114 may be used to perform various tasks related to the management of the computer network 104, such as remote management, software distribution, software license monitoring, operating system imaging and migration, IT asset management, problem resolution, and so forth. As part of performing these tasks, the management application 114 may connect to the management server 108 and query the management server 108 for information. An example of a management application 114 that may be used is the console application for the LANDesk® Management Suite.

To enable a user of the administrative system 102 to perform management tasks via the management application 114, the managed node 106 includes a management agent 116. The management agent 116 performs management-related tasks in response to requests from the management application 114. An example of a management agent 116 that may be used is the LANDesk® Management Agent.

As indicated above, one of the tasks performed by a user of the administrative system 102 (e.g., a network administrator or help desk operator) may be performing remote management operations on a managed node 106. To facilitate remote management operations, the management application 114 includes a remote management component 118, and the management agent 116 includes a remote management agent 120. The remote management component 118 and the remote management agent 120 work together to allow the user of the administrative system 102 to remotely perform management operations on the managed node 106, such as adding, repairing, and/or changing the configuration of the software and/or hardware of the managed node 106.

A display device 122 is provided for the managed node 106. The display device 122 is the visual output device of the managed node 106. The display device 122 includes a display screen 124. The display device 122 may utilize any suitable image projection technology, such as a cathode ray tube (CRT), liquid crystal display (LCD), light-emitting diode (LED), gas plasma, electroluminescence, or the like. A display controller 126 converts data stored in the memory of the managed node 106 into text, graphics, and/or moving images (as appropriate) shown on the display screen 124 of the display device 122. A display driver 128 allows applications on the managed node 106 to be able to communicate with the display controller 126 without knowing specific details about the display controller's 126 hardware and internal language.

Figure 2:
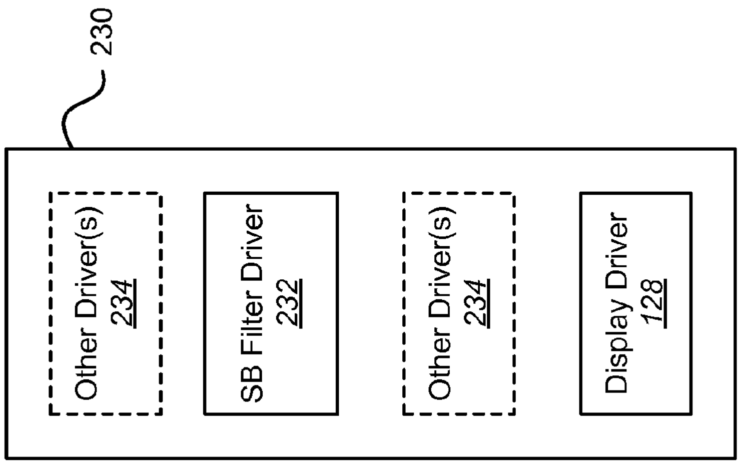
FIG. 2 illustrates an exemplary device stack that may be provided for the display device, the device stack including a screen blanking (SB) filter driver.

FIG. 2 illustrates an exemplary device stack 230 that may be provided for the display device 122. Some operating systems, such as the Microsoft Windows® family of operating systems, allow several driver layers to exist between an application and a piece of hardware. Multiple drivers may be grouped together in stacks that work together to completely process a request that is targeted at a particular device object. (A device object represents a logical, virtual, or physical device for which a driver handles input/output requests. The display device 122 is an example of a device object.) A stack of drivers for a particular device object is often referred to as a device stack.

The device stack for a particular device object may include one or more filter drivers. A filter driver is used to add features to a device object without modifying the underlying driver. In other words, a filter driver allows some aspects of an existing driver's behavior to be modified without the need to re-write the underlying driver. A filter driver may "attach" itself to a device stack for a device object. When this occurs, the filter driver receives all requests that are directed to the corresponding device object. This allows the filter driver to modify and/or withhold messages and data that are sent to the device object (e.g., the display device 122).

The display driver 128 is at the bottom of the device stack 230 for the display device 122. The device stack 230 also includes a screen blanking (SB) filter driver 232. The SB filter driver 232 has attached itself to the device stack 230 above the display driver 128. Accordingly, the SB filter driver 232 receives all messages that are directed to the display driver 128 before the messages are received by the display driver 128.

The SB filter driver 232 is configured to block "power on" messages that are sent to the display driver 128 while a remote management operation is being performed on the managed node 106. A power on message is a message that instructs the display driver 128 to supply power to the display screen 124 so that it is not blank. There are a variety of reasons why power on messages may be sent to the display driver 128. For example, if the display screen 124 has been powered off for power conservation reasons, the operating system on the managed node 106 may send a power on message to the display driver 128 in response to receiving input via some physical device at the managed node 106 (e.g., a mouse or a keyboard). If a remote management operation is being performed on the managed node 106 when a power on message is sent to the display driver 128, the SB filter driver 232 prevents the display driver 128 from receiving the power on message, so that the display screen 124 remains blank during the remote management operation. This will be explained in greater detail below.

In addition to the SB filter driver 232, the device stack 230 may include one or more other drivers 234. These other drivers 234 may be positioned above the SB filter driver 232 and/or between the SB filter driver 232 and the display driver 128.

Figure 3:
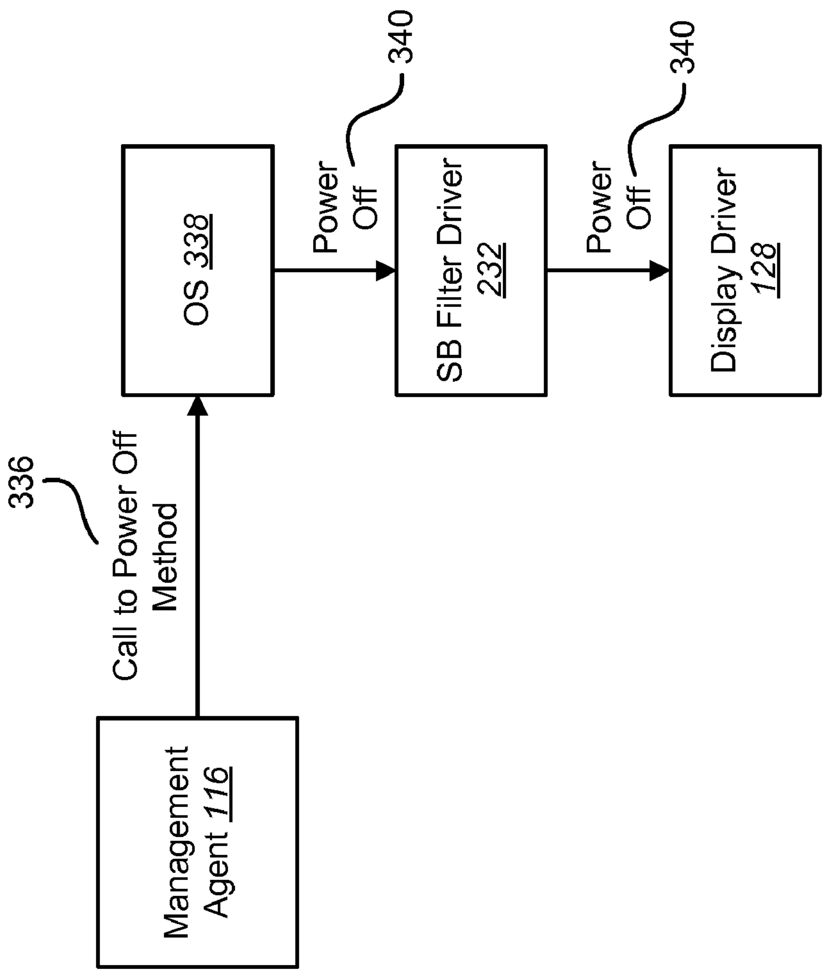
FIG. 3 illustrates some aspects of the operation of the management agent and the SB filter driver according to an embodiment.

FIGS. 3-6 illustrate some aspects of the operation of the management agent 116 and the SB filter driver 232 according to an embodiment. The management agent 116 may receive notification (from, e.g., the remote management component 118 on the management application 114) that a remote management operation is going to be performed on the managed node 106. Prior to the start of the remote management operation, the management agent 116 causes the display screen 124 of the display device 122 to be powered off. As shown in FIG. 3, this may be accomplished by making a call 336 to a method that is exposed by the operating system 338 and that provides for such a power transition. In response to such a method being called, the operating system 338 sends a message 340 to the display driver 128 which instructs the display driver 128 to power off the display screen 124. The power off message 340 is received by the SB filter driver 232 before it is received by the display driver 128. The SB filter driver 232 simply passes the power off message 340 to the display driver 128. In response to receiving the power off message 340, the display driver 128 causes the display screen 124 to be powered off.

Figure 4:
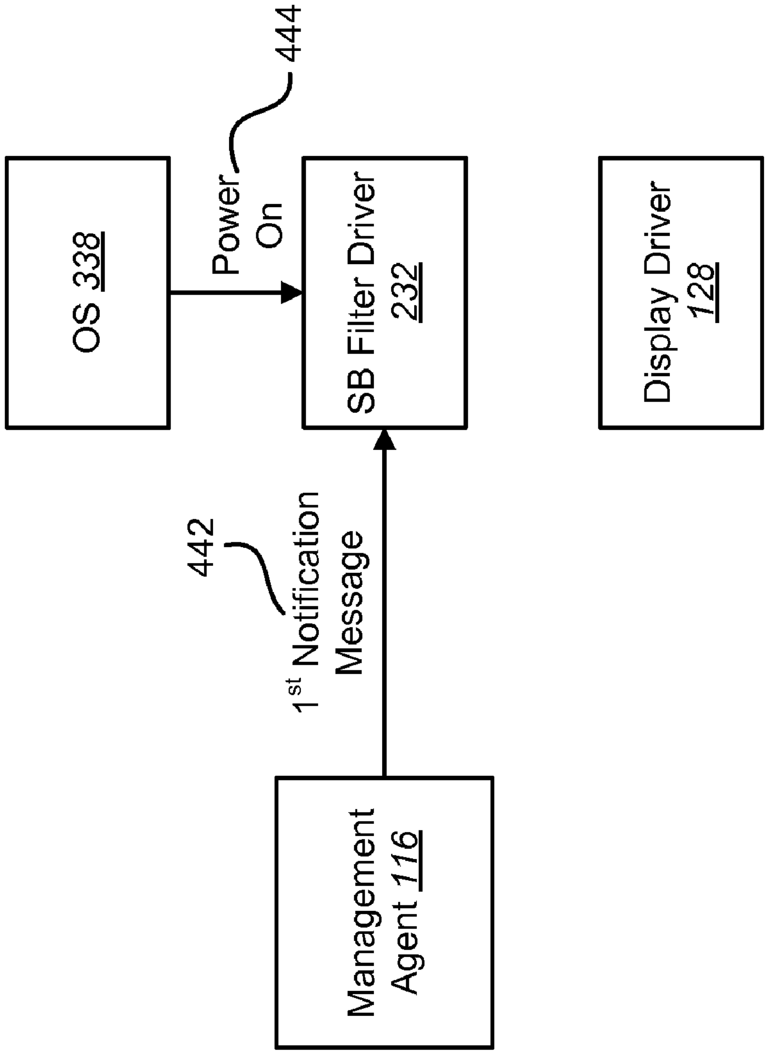
FIG. 4 illustrates some additional aspects of the operation of the management agent and the SB filter driver according to an embodiment.

The management agent 116 also notifies the SB filter driver 232 that a remote management operation is starting. As shown in FIG. 4, the management agent 116 may do this by sending a first notification message 442 to the SB filter driver 232 at the start of the remote management operation.

After the display screen 124 has been powered off, the operating system 338 may choose to restore power to the display screen 124. For example, in response to receiving input via some physical device at the managed node 106 (e.g., a mouse or a keyboard), the operating system 338 may send a message 444 to the display driver 128 which instructs the display driver 128 to power on the display screen 124 of the display device 122. However, the power on message 444 is received by the SB filter driver 232 before it is received by the display driver 128. Because the SB filter driver 232 knows that a remote management operation is being performed (as a result of the first notification message 442), the SB filter driver 232 blocks the display driver 128 from receiving the power on message 444. In other words, the SB filter driver 232 discards the power on message 444 so that the display driver 128 does not receive it.

Figure 5:
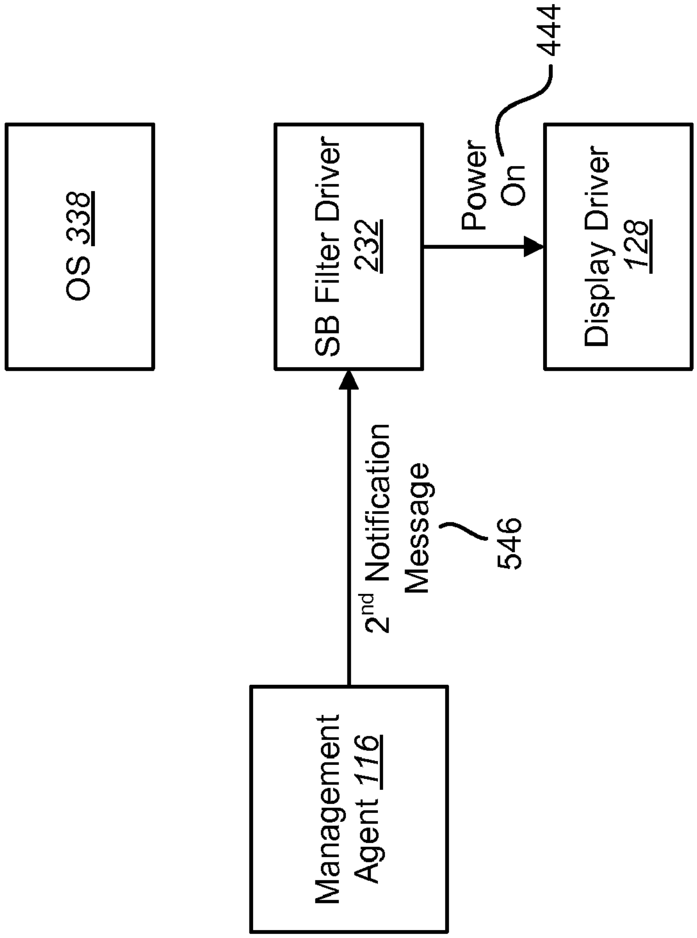
FIG. 5 illustrates some additional aspects of the operation of the management agent and the SB filter driver according to an embodiment.

The SB filter driver 232 continues to discard any power on messages 444 that it receives until it receives a second notification message 546 from the management agent 116, as shown in FIG. 5. The second notification message 546 notifies the SB filter driver 232 that the remote management operation has ended. In response to receiving the second notification message 546, the SB filter driver 232 stops discarding power on messages 444 that are sent to the display driver 128. Once it has been notified that the remote management operation has ended, the SB filter driver 232 simply passes any power on messages 444 that it receives to the display driver 128. In addition, the SB filter driver 232 also causes the display screen 124 of the display device 122 to be powered on. This may be accomplished by sending a power on message 444 to the display driver 128, i.e., a message 444 which simulates an instruction from the operating system 338 to power on the display screen 124. In response to receiving the power on message 444, the display driver 128 causes the display screen 124 to be powered on.

Figure 6:
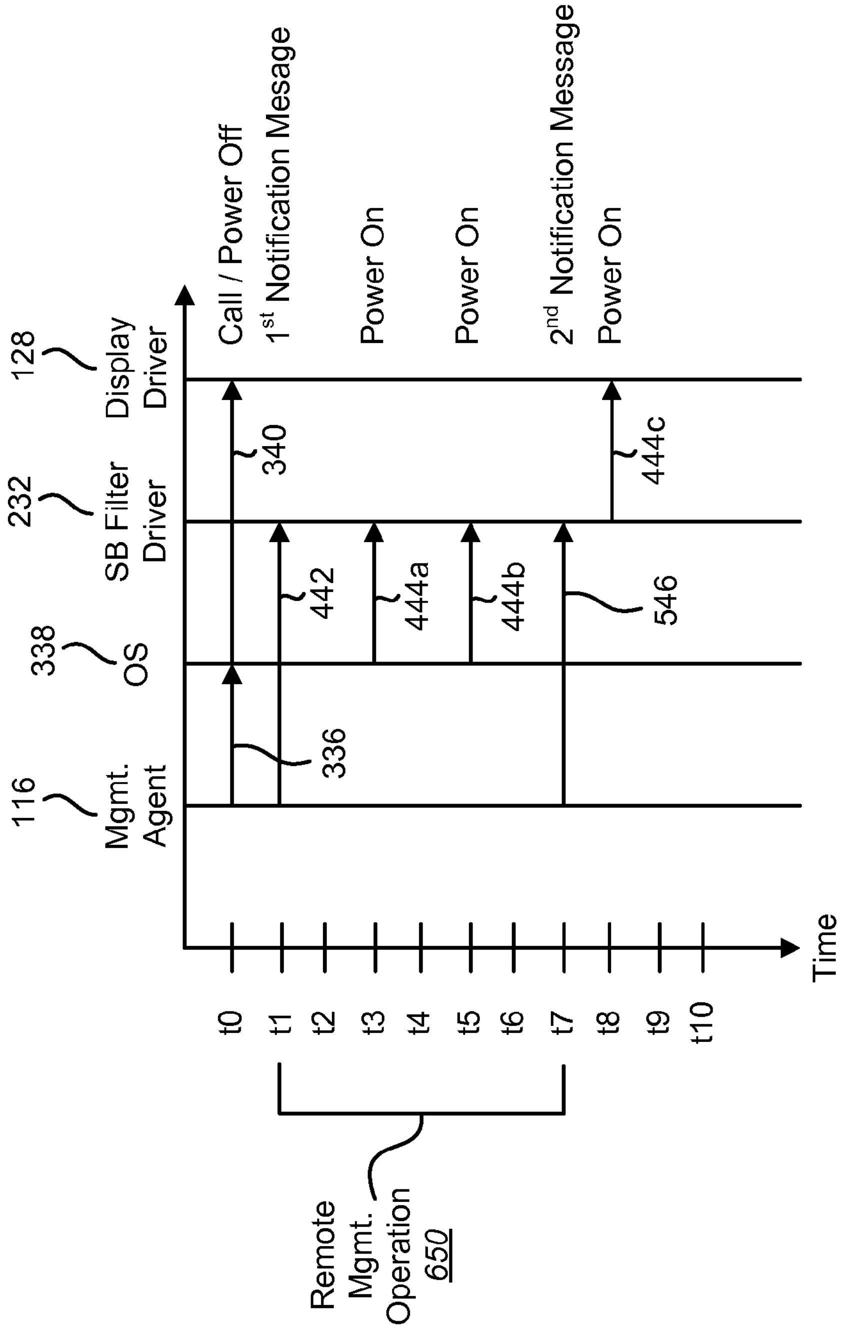
FIG. 6 illustrates some additional aspects of the operation of the management agent and the SB filter driver according to an embodiment.

FIG. 6 is a timing diagram which illustrates an example of the embodiment depicted in FIGS. 1-5. In the illustrated example, a remote management operation 650 is performed between times t1 and t7. Accordingly, the management agent 116 and the SB filter driver 232 work together to cause the display screen 124 of the display device 122 to remain blank during this time.

At time t0, prior to the start of the remote management operation 650, the management agent 116 makes a call 336 to a method that is exposed by the operating system 338 and that causes the display screen 124 of the display device 122 to be powered off. In response to such a method being called, the operating system 338 sends a message 340 to the display driver 128 which instructs the display driver 128 to power off the display screen 124 of the display device 122. The SB filter driver 232 receives the power off message 340 before it is received by the display driver 128, and simply passes the power off message 340 to the display driver 128. In response to receiving the power off message 340, the display driver 128 causes the display screen 124 to be powered off.

At time t1, the management agent 116 sends a first notification message 442 to the SB filter driver 232 to indicate that the remote management operation 650 has started. After it receives the first notification message 442, the SB filter driver 232 begins blocking all power on messages 444 that are sent to the display driver 128. In the illustrated example, the operating system 338 sends a first power on message **444*a* at time t3. The operating system 338 sends a second power on message 444*b* at time t5. (The operating system 338 may send these power on messages 444 in response to detecting activation of a user input device, such as a keyboard or a mouse.) However, the SB filter driver 232 discards these power on messages 444 so that they are not received by the display driver 128. Consequently, the display screen 124 of the display device 122 remains blank while the remote management operation 650** is being performed.

At time t7, the management agent 116 sends a second notification message 546 to the SB filter driver 232 to indicate that the remote management operation 650 has ended. After it receives the second notification message 546, the SB filter driver 232 stops blocking power on messages 444, so that any power on messages 444 that are subsequently sent to the display driver 128 are received and processed by the display driver 128. In addition, at time t8, the SB filter driver 232 sends a third power on message 444*c* to the display driver 128. The third power on message 444*c* simulates an instruction from the operating system 338 to power on the display screen 124. In response to receiving the third power on message 444*c*, the display driver 128 causes the display screen 124 to be powered on.

Figure 7:
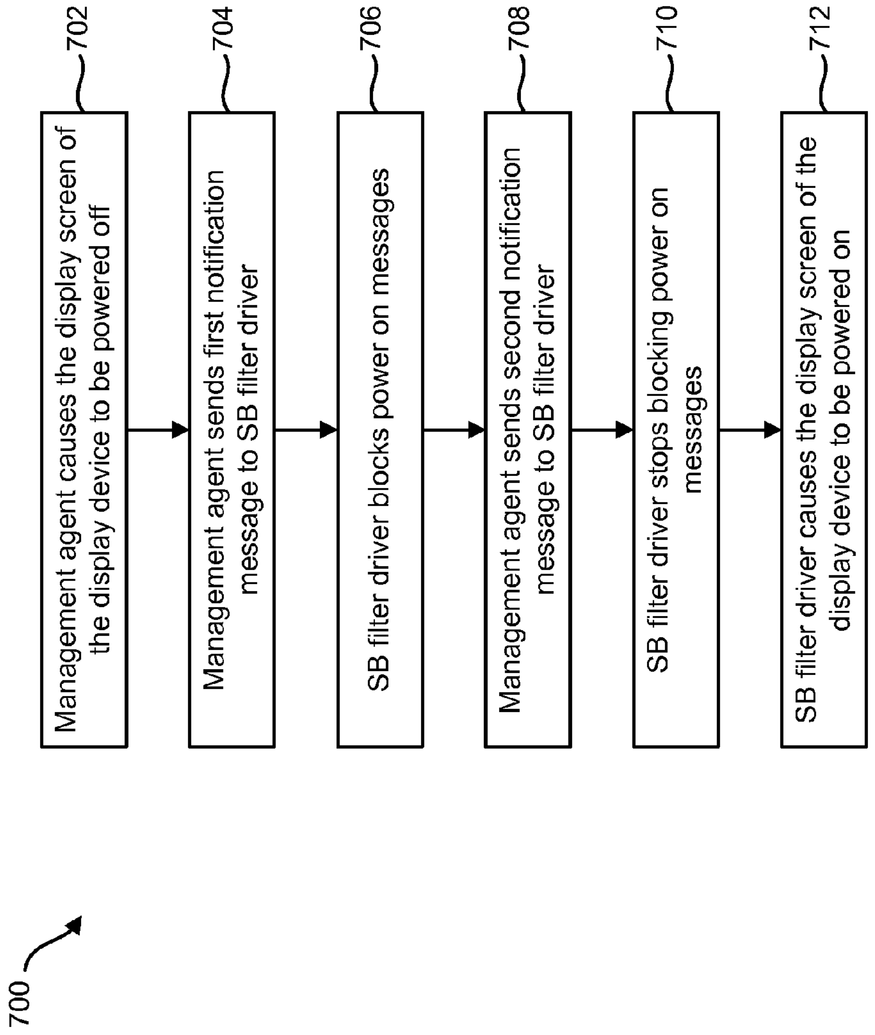
FIG. 7 illustrates an exemplary method that may be performed by the management agent and the SB filter driver.

FIG. 7 illustrates an exemplary method 700 that may be performed by the management agent 116 and the SB filter driver 232. At step 702, the management agent 116 causes the display screen 124 of the display device 122 to be powered off. This step may be performed just prior to the start of a remote management operation 650 being performed on the managed node 106. As indicated above, this step may involve making a call 338 to a method that is exposed by the operating system 338 and that provides for powering off the display screen 124 of the display device 122.

At step 704, the management agent 116 sends a first notification message 442 to the SB filter driver 232. The first notification message 442 notifies the SB filter driver 232 that a remote management operation 650 is starting. At step 706, in response to receiving the first notification message 442, the SB filter driver 232 begins blocking any power on messages 444 that are directed to the display driver 128.

At step 708, the management agent 116 sends a second notification message 546 to the SB filter driver 232. The second notification message 546 notifies the SB filter driver 232 that the remote management operation 650 has ended. At step 710, in response to receiving the second notification message 546, the SB filter driver 232 stops blocking power on messages 444 that are directed to the display driver 128. In addition, at step 712, the SB filter driver 232 causes the display screen 124 of the display device 122 to be powered on. This step may be performed just after the end of a remote management operation 650 being performed on the managed node 106. As indicated above, this step may involve sending a power on message 444 to the display driver 128, i.e., a message that simulates an instruction from the operating system 338 to power on the display screen 124. In response to receiving the power on message 444, the display driver 128 causes the display screen 124 to be powered on.

In the above discussion, the management agent 116 notifies the SB filter driver 232 about the remote management operation 650 by sending two notification messages, a first notification message 442 when the remote management operation starts and a second notification message 546 when the remote management operation ends. However, there are many other ways that the management agent 116 may notify the SB filter driver 232 about the remote management operation 650. For example, the management agent 116 may send a notification message at the start of the remote management operation, but not at the end of the remote management operation 650. The notification message may include an estimated duration for the remote management operation 650. Based on this estimated duration, the SB filter driver 232 may determine when the management operation is supposed to end. Alternatively still, the management agent 116 may send a notification message sometime prior to the start of the remote management operation. The notification message may include an indication of when the remote management operation 650 will begin, as well as an estimated duration for the remote management operation 650.

In the above discussion, the screen blanking operation has been performed on a managed node 106 in a computer network 104. However, embodiments are not limited in this regard. In fact, the disclosed techniques for blanking a display screen may be utilized in any computer system where it may be desirable to cause the display screen to go blank for a certain period of time. Also, in the above discussion, the screen blanking operation has occurred for the purpose of preventing a user from seeing information that may be displayed during a remote management operation. However, the techniques disclosed herein may be utilized during many other kinds of events as well.

Figure 8:
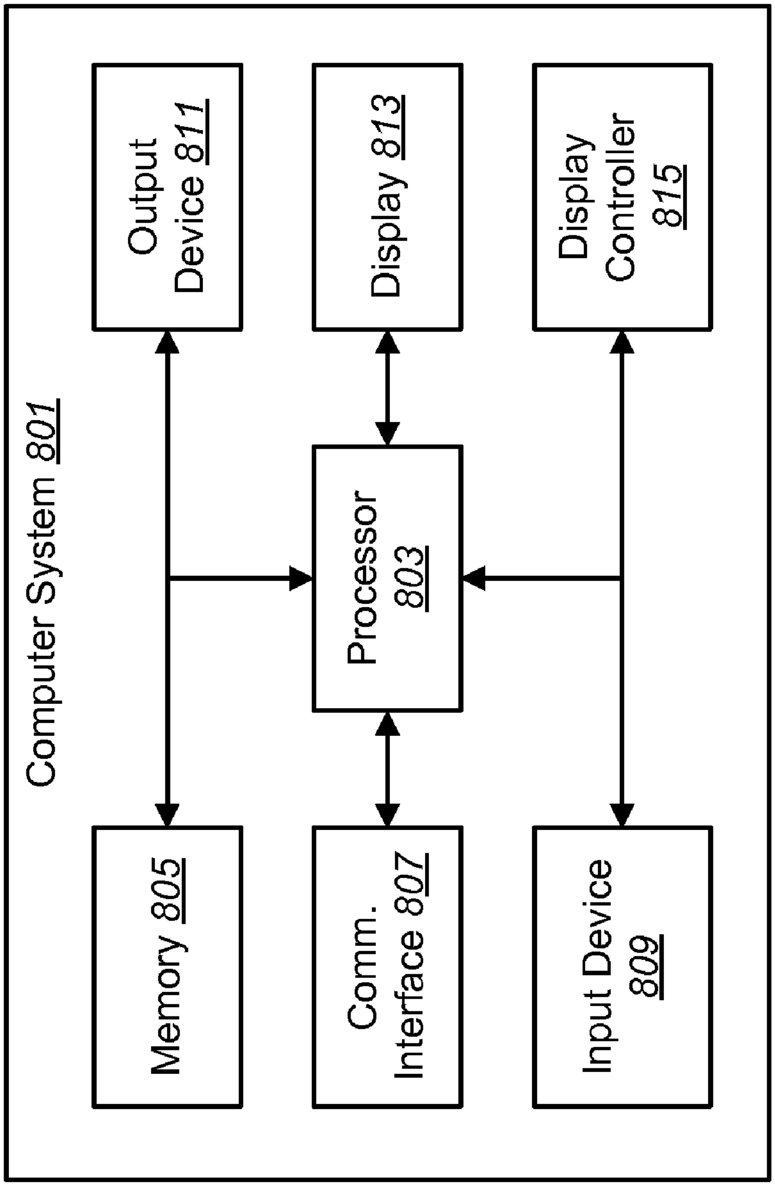
FIG. 8 is a block diagram illustrating the major hardware components typically utilized in a computer system.

FIG. 8 is a block diagram illustrating the major hardware components typically utilized in a computer system 801. The illustrated components may be located within the same physical structure or in separate housings or structures.

The computer system 801 includes a processor 803 and memory 805. The processor 803 controls the operation of the computer system 801 and may be embodied as a microprocessor, a microcontroller, a digital signal processor (DSP) or other device known in the art. The processor 803 typically performs logical and arithmetic operations based on program instructions stored within the memory 805.

As used herein, the term memory 805 is broadly defined as any electronic component capable of storing electronic information, and may be embodied as read only memory (ROM), random access memory (RAM), magnetic disk storage media, optical storage media, flash memory devices in RAM, on-board memory included with the processor 803, EPROM memory, EEPROM memory, registers, etc. The memory 805 typically stores program instructions and other types of data. The program instructions may be executed by the processor 803 to implement some or all of the methods disclosed herein.

The computer system 801 typically also includes one or more communication interfaces 807 for communicating with other electronic devices. The communication interfaces 807 may be based on wired communication technology, wireless communication technology, or both. Examples of different types of communication interfaces 807 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 801 typically also includes one or more input devices 809 and one or more output devices 811. Examples of different kinds of input devices 809 include a keyboard, mouse, microphone, remote control device, button, joystick, trackball, touchpad, lightpen, etc. Examples of different kinds of output devices 811 include a speaker, printer, etc. One specific type of output device which is typically included in a computer system is a display device 813. Display devices 813 used with embodiments disclosed herein may utilize any suitable image projection technology, such as a cathode ray tube (CRT), liquid crystal display (LCD), light-emitting diode (LED), gas plasma, electroluminescence, or the like. A display controller 815 may also be provided, for converting data stored in the memory 805 into text, graphics, and/or moving images (as appropriate) shown on the display device 813.

Of course, FIG. 8 illustrates only one possible configuration of a computer system 801. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for blanking a display screen on a display device of a computer system, the method being performed by a computer system having a processor and memory and instructions executable to implement a filter driver, the method comprising:

receiving notification of an event during which the display screen should be blank;

receiving messages that are directed to a display driver before the messages are received by the display driver, wherein the messages comprise at least one power on message that, if received by the display driver, would cause the display screen to be powered on; and discarding each power on message that is received during the event so that the display driver does not receive any power on messages during the event.

2. The method of claim 1, wherein the event is a remote management operation that is performed on the computer system.

3. The method of claim 2, wherein the notification of the remote management operation is received from a management agent on the computer system.

4. The method of claim 3, wherein the management agent receives notification of the remote management operation from a management application on an administrative system.

5. The method of claim 1, wherein receiving notification of the event comprises:

receiving a first message at a starting point for the event; and receiving a second message at an ending point for the event.

6. The method of claim 1, further comprising:

receiving a power off message prior to a starting point for the event; and passing the power off message to the display driver.

7. The method of claim 1, further comprising sending a power on message to the display driver after an ending point for the event.

8. The method of claim 1, wherein receiving messages that are directed to the display driver comprises attaching to a device stack for the display device.

9. The method of claim 8, wherein the filter driver attaches to the device stack so that it is positioned above the display driver in the device stack.

10. The method of claim 1, wherein the computer system is a managed node in a computer network.

11. A computer system that is configured for blanking a display screen on a display device of a computer system, the computer system comprising:

a processor;

memory in electronic communication with the processor;

instructions stored in the memory, the instructions being executable by the processor to:

receive notification of an event during which the display screen should be blank;

receive messages that are directed to a display driver before the messages are received by the display driver, wherein the messages comprise at least one power on message that, if received by the display driver, would cause the display screen to be powered on; and discard each power on message that is received during the event so that the display driver does not receive any power on messages during the event.

12. The computer system of claim 11, wherein the event is a remote management operation that is performed on the computer system.

13. The computer system of claim 11, wherein the instructions are further executable to:

receive a power off message prior to a starting point for the event; and pass the power off message to the display driver.

14. The computer system of claim 11, wherein the instructions are further executable to send a power on message to the display driver after an ending point for the event.

15. The computer system of claim 11, wherein receiving messages that are directed to the display driver comprises attaching to a device stack for the display device.

16. A computer-readable storage medium comprising executable instructions for blanking a display screen on a display device of a computer system, the instructions being executable to:

receive notification of an event during which the display screen should be blank;

receive messages that are directed to a display driver before the messages are received by the display driver, wherein the messages comprise at least one power on message that, if received by the display driver, would cause the display screen to be powered on; and discard each power on message that is received during the event so that the display driver does not receive any power on messages during the event.

17. The computer-readable storage medium of claim 16, wherein the event is a remote management operation that is performed on the computer system.

18. The computer-readable storage medium of claim 16, wherein the instructions are further executable to:

receive a power off message prior to a starting point for the event; and pass the power off message to the display driver.

19. The computer-readable storage medium of claim 16, wherein the instructions are further executable to send a power on message to the display driver after an ending point for the event.

20. The computer-readable storage medium of claim 16, wherein receiving messages that are directed to the display driver comprises attaching to a device stack for the display device.

* * * * *